(12) United States Patent
Sasaki et al.

(10) Patent No.: US 7,059,975 B2
(45) Date of Patent: Jun. 13, 2006

(54) TWO-PIECE SOLID GOLF BALL

(75) Inventors: Takashi Sasaki, Kobe (JP); Keiji Moriyama, Kobe (JP)

(73) Assignee: SRI Sports Limited, Kobe (JP)

(*) Notice: Subject to any disclaimer, the term of this patent is extended or adjusted under 35 U.S.C. 154(b) by 0 days.

(21) Appl. No.: 10/321,398

(22) Filed: Dec. 18, 2002

(65) Prior Publication Data

US 2003/0144085 A1    Jul. 31, 2003

(30) Foreign Application Priority Data

Dec. 21, 2001    (JP)    .............................. 2001/389215

(51) Int. Cl.
  A63B 37/04    (2006.01)
  A63B 37/06    (2006.01)
  A63B 37/12    (2006.01)
  A63B 37/14    (2006.01)

(52) U.S. Cl. ...................................... 473/377; 473/383
(58) Field of Classification Search ......... 473/351–385
    See application file for complete search history.

(56) References Cited

U.S. PATENT DOCUMENTS

| | | | |
|---|---|---|---|
| 4,062,825 A * | 12/1977 | Watabe et al. ............... | 524/847 |
| 5,516,110 A | 5/1996 | Yabuki et al. | |
| 5,645,496 A | 7/1997 | Endo et al. | |
| 5,752,889 A | 5/1998 | Yamagishi et al. | |
| 5,800,287 A * | 9/1998 | Yokota et al. ............... | 473/372 |
| 5,803,833 A * | 9/1998 | Nakamura et al. ........... | 473/377 |
| 5,803,834 A * | 9/1998 | Yamagishi et al. .......... | 473/377 |
| 5,863,264 A * | 1/1999 | Yamagishi et al. .......... | 473/377 |
| 5,993,968 A * | 11/1999 | Umezawa et al. ........... | 428/407 |
| 6,054,550 A * | 4/2000 | Umezawa et al. ............ | 528/76 |
| 6,121,357 A * | 9/2000 | Yokota ........................ | 524/406 |
| 6,319,154 B1 * | 11/2001 | Yoshida et al. ............. | 473/378 |
| 6,354,967 B1 * | 3/2002 | Nakamura et al. .......... | 473/378 |
| 6,520,870 B1 * | 2/2003 | Tzivanis et al. ............. | 473/371 |
| 6,561,929 B1 * | 5/2003 | Watanabe .................... | 473/377 |
| 2001/0031673 A1 | 10/2001 | Watanabe | |

FOREIGN PATENT DOCUMENTS

| | | | |
|---|---|---|---|
| GB | 2 316 875 A | | 11/1998 |
| JP | 63-220889 A | | 9/1988 |
| JP | 04117969 A | * | 4/1992 |
| JP | 6-98949 A | | 4/1994 |
| JP | 7-194732 A | | 8/1995 |
| JP | 9-215778 A | | 8/1997 |
| JP | 10-127823 A | | 5/1998 |
| JP | 2001-259080 A | | 9/2001 |

* cited by examiner

*Primary Examiner*—Eugene Kim
*Assistant Examiner*—Alvin A. Hunter, Jr.
(74) *Attorney, Agent, or Firm*—Birch Stewart Kolasch & Birch LLP (57) ABSTRACT

A two-piece solid golf ball having long flight distance when hit by a middle iron club to a driver, large spin amount when hit by a short iron club and the like and excellent controllability, while maintaining good shot feel as good as thread wound golf ball, said golf ball including a core and cover, wherein the core mainly contains cis-1,4-polybutadiene, with the surface hardness (D) of the core being higher than the center hardness of the core by not less than 15, and the cover is formed from a cover composition mainly containing a polyurethane-based thermoplastic elastomer as a base resin having a hardness (A) of 35 to 55 which is lower than that of (D), and assuming that the total dimple volume is represented by B (mm$^3$), the product AB is within the range of 20,000 to 30,000.

4 Claims, 1 Drawing Sheet

TWO-PIECE SOLID GOLF BALL

This nonprovisional application claims priority under 35 U.S.C. §119(a) on Patent Application No. 2001-389215 filed in JAPAN on Dec. 21, 2001, which is herein incorporated by reference.

FIELD OF THE INVENTION

The present invention relates to a two-piece solid golf ball. More particularly, it relates to a two-piece solid golf ball, of which flight distance is long when hit by a middle iron club to a driver, and spin amount is large and controllability is excellent when hit by a short iron club and the like, while maintaining a good shot feel equivalent to that of thread wound golf ball.

BACKGROUND OF THE INVENTION

Golf balls having various structures are commercially selling. There are generally solid golf balls represented by two-piece golf ball and thread wound golf balls for round games. The two-piece solid golf balls have excellent flight performance and durability as compared with the thread wound golf balls. Therefore the two-piece solid golf balls occupy the greater part of the golf ball market. However, the two-piece solid golf ball is inferior to the thread wound golf ball in shot feel and controllability at approach shot.

There has been many suggestions in order to further improve performances of the two-piece solid golf ball. For example, in Japanese Patent Kokai publication Nos. 220889/1988, 98949/1994, 194732/1995 and the like, a two-piece solid golf ball, of which performances, such as flight distance (rebound characteristics), durability, shot feel and controllability are improved by mainly adjusting hardness or hardness distribution of the core to a proper range, is suggested. In Japanese Patent Kokai publication No. 127823/1998, a two-piece solid golf ball, of which performances are improved by adjusting thickness and hardness of the cover, and hardness distribution of the golf ball to proper ranges, is suggested. In Japanese Patent Kokai publication No. 215778/1997, a two-piece solid golf ball, of which performances are improved by adjusting specific gravity of the core or cover, properties of dimple and moment of inertia to proper ranges, is suggested. In Japanese Patent Kokai publication No. 259080/2001, a two-piece solid golf ball, of which performances are improved by adjusting hardness distribution of the core, thickness and hardness of the cover, hardness of the golf ball and properties of dimple to proper ranges, is suggested.

In Japanese Patent Kokai publication No. 220889/1988, a two-piece solid golf ball having a hardness distribution in JIS-C hardness such that a hardness at the distance of less than 10 mm from the center point of the core is within the range of 60 to 79 and a hardness at the distance of more than 10 mm from the center point is within the range of 80 to 90; a thickness of the cover of 1.5 to 2.0 mm; and a deformation amount of the golf ball of 1.9 to 2.4 mm when applying from an initial load of 10 kgf to a final load of 130 kgf; is disclosed. However, in the golf ball, it is problem that the deformation amount of the golf ball is small, that is, the golf ball is hard, and its shot feel is poor.

In Japanese Patent Kokai publication No. 98949/1994, a two-piece solid golf ball having a hardness distribution of the core such that a hardness of the core is higher in order at the center point of the core, at the distance of 5 to 10 mm from the center point, at the distance of 15 mm from the center point and at the surface of the core is disclosed. However, in the golf ball, the cover is formed from relatively hard material, and its flight distance is long, but it is problem that its spin amount when hit by a short iron club and the like is small, which degrades its controllability.

In Japanese Patent Kokai publication No. 194732/1995, a two-piece solid golf ball having a center hardness in JIS-C hardness of the core of 40 to 57, a surface hardness in JIS-C hardness of the core of 70 to 95, and a difference between the surface hardness and center hardness of 20 to 40 is disclosed. However, also in the golf ball, the cover is formed from relatively hard material, and it is problem that its spin amount when hit by a short iron club and the like is small, which degrades its controllability.

In Japanese Patent Kokai publication No. 127823/1998, a two-piece solid golf ball having a thickness of the cover of 1.0 to 2.1 mm, which is thin; a JIS-C hardness of the cover of 75 to 95; and a hardness distribution such that a difference between the cover hardness and a center hardness in JIS-C hardness of the core is not more than 10, which is small; is disclosed. However, in the golf ball, the cover is formed from only ionomer resin, and it is problem that its rebound characteristics is poor, and its flight distance when hit by a driver is short.

In Japanese Patent Kokai publication No. 215778/1997, a two-piece solid golf ball, of which the core has a specific gravity of not less than 1.00; a specific gravity of the cover is higher than that of the core; properties of dimple such as a ratio of ball surface area occupied by the dimple, a dimple space volume and the like, and a relationship between moment of inertia and cover hardness are adjusted to proper ranges; is disclosed. However, in the golf ball, since the specific gravity of the cover is too large, the moment of inertia of the resulting golf ball is very large. Therefore, in case of golf ball having relatively hard cover, since initial spin amount is small, its flight distance is improved by restraining the decrement of the spin amount is restrained. On the other hand, in case of golf ball having relatively soft cover in view of controllability, since retention of spin amount is too high than need be, and the hit golf ball creates blow-up trajectory, which reduces the flight distance.

In Japanese Patent Kokai publication No. 259080/2001, a two-piece solid golf ball, of which the core has a difference between a surface hardness and center hardness of not less than 20; the cover has a thickness of 1.3 to 2 mm and a Shore D hardness of not more than 55; a hardness difference in JIS-C hardness between the surface of the cover and the surface of the core is not more than 0; properties of dimple such as total number of dimples, percent dimple volume and the like are adjusted to proper ranges; is disclosed. However, since soft ionomer resin is used as a cover material, rebound characteristics the resulting golf ball are degraded, which reduces it flight distance. In addition, its scuff resistance is poor.

It is required to provide a two-piece golf ball having excellent flight performance, good shot feel and controllability by solving the problems. Recently, multi-piece solid golf balls having excellent flight performance, good shot feel and controllability, as compared with a conventional two-piece solid golf ball, are developed. Therefore it is required to further improve the flight performance, shot feel and controllability also in the two-piece golf ball.

OBJECTS OF THE INVENTION

A main object of the present invention is to provide a two-piece solid golf ball, in which the flight distance is long when hit by a middle iron club to a driver, and the spin amount is large and controllability is excellent when hit by a short iron club and the like, while at the same time maintaining good shot feel as good as a thread wound golf ball.

According to the present invention, the object described above has been accomplished by employing polyurethane-based thermoplastic elastomer in the cover, and adjusting the cover hardness, the hardness distribution of the core and golf ball and the product of the cover hardness and total dimple volume to specified ranges, thereby providing a two-piece solid golf ball in which the flight distance is long when hit by a middle iron club to a driver, and spin amount is large and controllability is excellent when hit by a short iron club and the like, while maintaining a good shot feel as good as a thread wound golf ball.

BRIEF EXPLANATION OF DRAWINGS

The present invention will become more fully understood from the detailed description given hereinbelow and the accompanying drawings, which are given by way of illustration only, and thus are not limitative of the present invention, and wherein.

SUMMARY OF THE INVENTION

The present invention provides a two-piece solid golf ball comprising a core and a cover covering the core, wherein the core comprises cis-1,4-polybutadiene as a main component, a surface hardness in Shore D hardness of the core is higher than a center hardness in Shore D hardness of the core by not less than 15, the cover is formed from a cover composition mainly comprising polyurethane-based thermoplastic elastomer as a base resin, and has a hardness in Shore D hardness of 35 to 55, and the hardness of the cover is lower than the surface hardness of the core, and assuming that the hardness of the cover is represented by A and the total dimple volume is represented by B (mm$^3$), the product AB is within the range of 20,000 to 30,000.

In the golf ball of the present invention, the flight distance is long by optimizing the hardness difference between the surface and center point of the core to accomplish high launch angle and low spin amount when hit by a middle iron club to a driver;

the flight distance is long by optimizing the product of the cover hardness and the total dimple volume to optimize the trajectory of the hit golf ball; and a two-piece solid golf ball, of which the flight distance is long when hit by a middle iron club to a driver, and the spin amount is large and controllability is excellent when hit by a short iron club and the like, while maintaining good shot feel as good as a thread wound golf ball is provided by employing a polyurethane-based thermoplastic elastomer in the cover, and optimizing the difference between the surface hardness of the core and cover hardness.

In order to put the present invention into a more suitable practical application, it is preferable that the cover have a thickness of 0.5 to 2.0 mm, and a specific gravity of the cover is not more than that of the core;

the polyurethane-based thermoplastic elastomer be formed by using a cycloaliphatic diisocyanate; and the cycloaliphatic diisocyanate is 4,4'-dicyclohexyl-methane diisocyanate (H$_{12}$MD1).

DETAILED DESCRIPTION OF THE INVENTION

The two-piece solid golf ball of the present invention comprises a core and a cover covering the core. The core is obtained by press-molding and vulcanizing a rubber composition under applied heat by using a method and condition, which has been conventionally used for preparing solid cores of golf balls. The rubber composition contains a base rubber, a co-crosslinking agent, an organic peroxide, a filler, an antioxidant and the like.

The base rubber used for the core of the present invention may be natural rubber and/or synthetic rubber, which has been conventionally used for cores of solid golf balls. Preferred is high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.). The preferred co-crosslinking agent is zinc acrylate, because it imparts high rebound characteristics to the resulting golf ball. The amount of the co-crosslinking agent is from 10 to 50 parts by weight, preferably from 20 to 40 parts by weight, based on 100 parts by weight of the base rubber. When the amount of the co-crosslinking agent is smaller than 10 parts by weight, the core is too soft, and the rebound characteristics of the resulting golf ball are degraded are degraded, which reduces the flight distance. In addition, since the cover is formed from soft materials, the resulting golf ball is too soft, and the shot feel is poor. On the other hand, when the amount of the co-crosslinking agent is larger than 50 parts by weight, the core is too hard, and the shot feel of the resulting golf ball is poor.

The organic peroxide includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.3 to 3.0 parts by weight, preferably 1.4 to 2.0 parts by weight, based on 100 parts by weight of the base rubber. When the amount of the organic peroxide is smaller than 0.3 parts by weight, the core is too soft, and the rebound characteristics of the resulting golf ball are degraded, which reduces the flight distance. On the other hand, when the amount of the organic peroxide is larger than 3.0 parts by weight, it is required to decrease the amount of the co-crosslinking agent, and the rebound characteristics of the resulting golf ball are degraded, which reduces the flight distance.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler is from 2 to 50 parts by weight, preferably from 5 to 40 parts by weight, based on 100 parts by weight of the base rubber. When the amount of the filler is smaller than 2 parts by weight, it is difficult to adjust the weight of the resulting golf ball to a proper range. On the other hand, when the amount of the filler is larger than 50 parts by weight, the weight of the core is too large, and it is difficult to adjust the weight of the resulting golf ball to a proper range.

The rubber compositions for the core of the golf ball of the present invention can contain other components, which have been conventionally used for preparing the core of solid golf balls, such as antioxidant or peptizing agent. If used, the amount of the antioxidant is preferably 0.2 to 1.0 parts by weight, based on 100 parts by weight of the base rubber.

The core of the golf ball of the present invention can be obtained by mixing the rubber composition, and then press-molding and vulcanizing the mixture under applied heat in a mold. The vulcanizing, of which the condition is not limited, is conducted at 130 to 180° C. and 2.9 to 9.8 MPa for 10 to 50 minutes.

In the golf ball of the present invention, the core has a diameter of 38.5 to 42 mm, preferably 39 to 42 mm, more preferably 39.5 to 42 mm. When the diameter of the core is smaller than 38.5 mm, it is required to increase the thickness of the cover in order to adjust the diameter of the resulting golf ball to diameter conformed to the regulations for golf balls. Therefore, the spin amount when hit by a driver is large, which reduces the flight distance. On the other hand, when the diameter of the core is larger than 42 mm, the diameter of the resulting golf ball is too large, and air resistance of the hit golf ball is large, which reduces the flight distance. Therefore, when adjusting the diameter of the resulting golf ball to diameter conformed to the regulations for golf balls, the thickness of the cover is too small, and spin performance at approach shot is degraded.

In the golf ball of the present invention, it is required for the core to have a surface hardness in Shore D hardness higher than a center hardness in Shore D hardness by not less than 15, preferably not less than 18, more preferably not less than 20. When the hardness difference between the surface hardness and center hardness is smaller than 15, the spin amount at the time of hitting is increased, which reduces the flight distance. On the other hand, when the hardness difference is too large, the center hardness of the core is too low, and the rebound characteristics are degraded, which reduces the flight distance. Therefore, it is desired for the upper limit of the hardness difference to be not more than 50, preferably not more than 45, more preferably not more than 40.

In the golf ball of the present invention, it is desired for the core to have the surface hardness in Shore D hardness of 50 to 65, preferably 52 to 62, more preferably 53 to 60. When the hardness is lower than 50 or higher than 65, it is difficult to adjust the deformation amount of the resulting golf ball to a proper range, which degrades the shot feel or flight distance. The term "a surface hardness of the core" as used herein refers to the hardness, which is determined by measuring a hardness at the surface of the resulting core.

In the golf ball of the present invention, it is desired for the core to have the center hardness in Shore D hardness of 10 to 45, preferably 15 to 40, more preferably 20 to 35. When the center hardness is lower than 10, the deformation amount of the core is too large and the resulting golf ball is too soft, and the shot feel is poor. On the other hand, when the center hardness is higher than 45, the deformation amount of the core is too small and the resulting golf ball is too hard, and the shot feel is poor. The term "a center hardness of the core" as used herein refers to the hardness, which is determined by cutting the resulting core into two equal parts and then measuring a hardness at its center point in section.

In the golf ball of the present invention, it is desired for the core to have a deformation amount when applying from an initial load of 98 N to a final load of 1275 N of 2.4 to 3.8 mm, preferably 2.5 to 3.6 mm, more preferably 2.6 to 3.4 mm. When the deformation amount of the core is smaller than 2.4 mm or larger than 3.8 mm, it is difficult to adjust the deformation amount of the resulting golf ball to a proper range, which degrades the shot feel or flight distance.

In the golf ball of the present invention, it is desired for the core to have a specific gravity of 1.05 to 1.25, preferably 1.1 to 1.2. When the specific gravity of the core is lower than 1.05, the resulting golf ball is too light, which reduces the flight performance. On the other hand, when the specific gravity of the core is higher than 1.25, it is difficult to conform both the diameter and weight of the resulting golf ball to the regulations for golf balls.

The core is then covered by the cover. In the golf ball of the present invention, it is desired for the cover to have a thickness of 0.5 to 2.0 mm, preferably 0.5 to 1.8 mm, more preferably 0.5 to 1.5 mm. When the thickness of the cover is smaller than 0.5 mm, good shot feel and spin performance are not sufficiently obtained. On the other hand, when the thickness is larger than 2.0 mm, the rebound characteristics of the resulting golf ball are degraded. In addition, the spin amount when hit by a driver or middle iron club is large, which reduces the flight distance.

In the golf ball of the present invention, it is required for the cover to have a hardness in shore D hardness lower than the surface hardness of the core, and the hardness difference is preferably 1 to 25, more preferably 5 to 20. When the cover hardness is not less than the surface hardness of the core, the shot feel and controllability are poor. On the other hand, when the hardness difference between the cover hardness and surface hardness of the core is larger than 25, the cover is too soft, and the spin amount when hit by a driver and the like is increased, which reduces the flight distance.

In the golf ball of the present invention, it is required for the cover to have a hardness in Shore D hardness of 35 to 55, preferably 38 to 53, more preferably 40 to 50, preferably 40 to 47. When the cover hardness is lower than 35, the cover is too soft, and the spin amount when hit by a driver or middle iron club is increased, which reduces the flight distance. On the other hand, when the cover hardness is higher than 55, the cover is too hard, and the impact force at the time of hitting is large, which degraded the shot feel. In addition, the spin amount at approach shot and the like is low, and the controllability is degraded.

In the golf ball of the present invention, it is desired for the value of [A/(t+1)] to be within the range of 16 to 28, preferably 17 to 26, more preferably 18 to 25, assuming that the thickness of the cover is represented by "t" and the hardness of the cover is represented by "A". When the value of [A/(t+1)] is smaller than 16, the hardness of the cover is too low or the thickness of the cover is too large, which reduces the flight distance.

In the golf ball of the present invention, it is desired for the specific gravity difference (E−F) between the specific gravity of the core (E) and that of the cover (F) to be within the range of −0.05 to 0.10, preferably 0 to 0.07. When the specific gravity difference (E−F) is smaller than −0.05, that is, the specific gravity of the cover (F) is much larger than that of the core (E), the moment of inertia is too large, and the flight performance and controllability are degraded. On the other hand, when the specific gravity difference is larger than 0.10, the specific gravity of the cover (F) is too small, and the moment of inertia is too large. Therefore, the decrement of spin amount on the fly is large, which reduces the flight distance.

In the golf ball of the present invention, it is desired for the cover to have a specific gravity of 1 to 1.2, preferably 1.02 to 1.15. When the specific gravity of the cover is smaller than 1, the moment of inertia of the resulting golf ball is small, and the decrement of spin amount on the fly is large, which reduces the flight distance. On the other hand, when the specific gravity of the cover is larger than 1.2, the moment of inertia of the resulting golf ball is too large, and the spin amount on the fly is too large. Therefore, the hit golf ball creates a blow-up trajectory, which reduces the flight distance.

In the golf ball of the present invention, it is required for the cover to be formed from a cover composition mainly comprising polyurethane-based thermoplastic elastomer as a base resin. The polyurethane-based thermoplastic elastomer generally contains polyurethane structure as hard segment and polyol such as polyester polyol or polyether polyol as soft segment. The polyurethane structure generally contains diisocyanate and chain extender (such as polyvalent alcohol, amine-based chain extender). The polyol and chain extender are not limited, but may be compounds, which have been generally used for thermoplastic elastomer.

Examples of the diisocyanates include aromatic diisocyanate, such as 4,4'-diphenylmethane diisocyanate (MDI), tolylene diisocyanate (TDI), p-phenylene diisocyanate (PPDI); aliphatic diisocyanate, such as hexamethylene diisocyanate (HDI), lysine diisocyanate (LDI); cycloaliphatic diisocyanate, such as 4,4'-dicyclohexylmethane diisocyanate ($H_{12}$MDI), isophorone diisocyanate (IPDI), 1,3-bis(isocyanatomethyl)cyclohexane ($H_6$XDI), trans-1,4-cyclohexane diisocyanate (CHDI); and the like. Preferred is the cycloaliphatic diisocyanate in view of yellowing resistance and scuff resistance, particularly preferred is $H_{12}$MDI.

Concrete examples of the polyurethane-based thermoplastic elastomer formed by using the $H_{12}$MDI include polyurethane-based thermoplastic elastomers, which are commercially available from BASF Polyurethane Elastomers Co., Ltd. under the trade name of "Elastollan XNY90A", "Elastollan XNY97A", "Elastollan XNY585", and the like.

Preferred are polyurethane-based thermoplastic elastomers formed by using diisocyanate having no double bond in backbone structure in molecule, that is, aliphatic diisocyanate and cycloaliphatic diisocyanate in view of yellowing resistance. Preferred are polyurethane-based thermoplastic elastomers formed by using cycloaliphatic diisocyanate and aromatic diisocyanate, which have high mechanical strength, in view of scuff resistance. Therefore, in the present invention, preferred is polyurethane-based thermoplastic elastomer formed by using cycloaliphatic diisocyanate in view of both the yellowing resistance and scuff resistance.

As the materials suitably used for the cover in the golf ball of the present invention, the above polyurethane-based thermoplastic elastomer may be used alone, but the polyurethane-based thermoplastic elastomer may be used in combination with ionomer resin or the other thermoplastic elastomers, such as polyester-based thermoplastic elastomer, polyamide-based thermoplastic elastomer, styrene-based thermoplastic elastomer, polyolefin-based thermoplastic elastomer and the like. The other thermoplastic elastomers may have functional groups, such as carboxyl group, glycidyl group, sulfone group, epoxy group and the like.

If used, the amount of the other thermoplastic elastomer or ionomer resin is 0 to 40 parts by weight, preferably 0 to 30 parts by weight, based on 100 parts by weight of the base resin for the cover. When the amount is larger than 40 parts by weight, at least one of scuff resistance, rebound characteristics and yellowing resistance is degraded The cover composition used in the present invention may optionally contain fillers (barium sulfate, calcium carbonate and the like), pigments (such as titanium dioxide, etc.) and the other additives such as a dispersant, an antioxidant, a UV absorber, a photostabilizer and a fluorescent agent or a fluorescent brightener, etc., in addition to the above base resin as long as the addition of the additives does not deteriorate the desired performance of the golf ball cover. If used, the amount of the pigment is preferably 0.1 to 5.0 parts by weight, based on 100 parts by weight of the base resin for the cover.

A method of covering on the core with the cover is not specifically limited, but may be a conventional method. For example, there can be used a method comprising molding the cover composition into a semi-spherical half-shell in advance, covering the core with the two half-shells, followed by press molding at 130 to 170° C. for 1 to 5 minutes, or a method comprising injection molding the cover composition directly on the core, which is covered with the cover, to cover it. At the time of molding the cover, many depressions called "dimples" are formed on the surface of the golf ball.

In the golf ball of the present invention, assuming that the hardness of the cover is represented by A and a total dimple volume is represented by B (mm³), it is required for the product AB to be within the range of 20,000 to 30,000, preferably 22,000 to 28,000, more preferably 22,000 to 25,000. When the value of AB is smaller than 20,000, the hit golf ball creates a blow-up trajectory, which reduces the flight distance. On the other hand, when the value of AB is larger than 30,000, the trajectory of the hit golf ball is too low and the golf ball is easy to drop, which reduces the flight distance.

In the golf ball of the present invention, the trajectory of the hit is optimized to improve the flight distance by decreasing the total dimple volume when the cover hardness is high, increasing the total dimple volume when the cover hardness is low, and adjusting the product of the both (AB) to a specified range.

It is desired for the total dimple volume (B) to be within the range of 350 to 650 mm³, preferably 400 to 600 mm3, more preferably 450 to 600 mm³. When the total dimple volume is smaller than 350 mm³, the hit golf ball creates a blow-up trajectory, which reduces the flight distance. On the other hand, when the total dimple volume is larger than 600 mm³, the trajectory of the hit golf ball is too low and the golf easily drops, which reduces the flight distance. The term total dimple volume (B) refers to the sum of a volume of a space corresponding to the portion removed from the golf ball by arranging the dimple on the surface of the golf ball.

It is desired for the dimple to have a total number of 250 to 500, preferably 300 to 480, more preferably 350 to 450. When the total number of the dimples is smaller than 250, it is difficult for the golf ball to have approximately spherical shape while maintaining the desired ratio of the golf ball surface area occupied by the dimple, that is, it is difficult to maintain smoothness of the surface of the golf ball. On the other hand, when the total number of the dimples is larger than 500, each dimple is small, and drag coefficient immediately after hitting is large, which reduces the flight distance.

It is desired for the ratio of the golf ball surface area occupied by the dimple to the total surface area of the golf ball to be within the range of 0.70 to 0.90, preferably 0.75 to 0.90. When the ratio is smaller than 0.70, the technical effects accomplished by the presence of the dimples are not sufficiently obtained, and the trajectory of the hit golf ball is low, which reduces the flight distance. On the other hand, when the ratio is larger than 0.90, the hit golf ball creates blow-up trajectory, which reduces the flight distance. The term "a ratio of the golf ball surface area occupied by the dimple" refers to a ratio of (the sum of an area of a spherical surface corresponding to the portion removed from the golf ball by arranging the dimple on the surface of the golf ball) to (the surface area of the golf ball) assuming that the golf ball is a true sphere having no dimples on the surface thereof.

In the golf ball of the present invention, the periphery shape of the dimple is typically circular, but may be non-circular (such as oval) as long as the dimple satisfies the above values of the properties of the dimple. When the dimple is circular, it may be single radius, double radius, or combination thereof In the golf ball of the present invention, furthermore, paint finishing or marking with a stamp may be provided after the cover is molded for commercial purposes. The ratio of the golf ball surface area occupied by the dimple, and the total volume of the dimples as used herein are determined by measuring at the surface of the resulting golf ball, and if paint is applied on the cover, they are determined by measuring at the surface of the applied golf ball.

In the golf ball of the present invention, it is desired to have a deformation amount when applying from an initial load of 98 N to a final load of 1275 N of 2.2 to 3.5 mm, preferably 2.3 to 3.4 mm, more preferably 2.5 to 3.3 mm. When the deformation amount is smaller than 2.2 mm, the golf ball is too hard, and the shot feel is hard and poor. On the other hand, when the deformation amount is larger than 3.5 mm, the golf ball is too soft, and the shot feel is heavy and poor or the flight distance is reduced.

In the golf ball of the present invention, it is desired to have a moment of inertia of 81 to 84 gcm$^2$, preferably 81.5 to 83.5 gcm$^2$. In the structure of the golf ball of the present invention, a balance between excellent flight performance and good controllability is accomplished by adjusting the moment of inertia to the above range.

The golf ball of the present invention is formed to a diameter of at least 42.67 mm (preferably 42.67 to 42.90 mm) and a weight of not more than 45.93 g (preferably 44.50 to 45.93 g), in accordance with the regulations for golf balls.

The diameter of golf balls is limited to not less than 42.67 mm in accordance with the regulations for golf balls as described above. Generally, when the diameter of the golf ball is large, air resistance of the golf ball on the fly is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter.

EXAMPLES

The following Examples and Comparative Examples further illustrate the present invention in detail but are not to be construed to limit the scope of the present invention.

Production of Core

The rubber compositions for the core having the formulations shown in Table 1 were mixed, and then vulcanized by press-molding at the vulcanization condition shown in the same Table to obtain spherical cores having a diameter of 39.9 mm. The deformation amount, center hardness (D) and surface hardness (C) of the resulting core were measured, and the hardness difference (C–D) was determined by calculation. The results are shown in the same Table. The test methods are described later.

TABLE 1

| | (parts by weight) | | | | |
|---|---|---|---|---|---|
| | i | ii | iii | iv | v |
| Core composition | | | | | |
| BR11 *1 | 100 | 100 | 100 | 100 | 100 |
| Zinc acrylate | 33 | 33 | 37 | 40 | 40 |
| Zinc oxide | 17.8 | 17.8 | 16.4 | 15.3 | 15.3 |
| Dicumyl peroxide | 0.9 | 0.9 | 0.9 | 0.9 | 0.9 |
| Diphenyl disulfide | 0.5 | 0.5 | 0.5 | 0.5 | 0.5 |
| Vulcanization condition | | | | | |
| The first stage | | | | | |
| Temp. (° C.) | 170 | 170 | 170 | 170 | 144 |
| Time (min) | 15 | 15 | 15 | 15 | 22 |
| The second stage | | | | | |
| Temp. (° C.) | — | — | — | — | 160 |
| Time (min) | — | — | — | — | 8 |

*1: High-cis Polybutadiene rubber (trade name "BR11") available from JSR Co., Ltd. (Content of 1,4-cis-polybutadiene: 96%)

Preparation of Cover Compositions

The formulation materials shown in Table 2 were mixed using a kneading type twin-screw extruder to obtain pelletized cover compositions. The extrusion condition was, a screw diameter of 45 mm, a screw speed of 200 rpm, and a screw L/D of 35. The formulation materials were heated at 150 to 220° C. at the die position of the extruder. The cover hardness (A) was determined by measuring Shore D hardness, using a sample of a stack of the three or more heat and press molded sheets having a thickness of about 2 mm from the resulting composition. The hardness difference (DA) was determined by calculation. The results are shown in Table 3 (Examples) and Table 4 (Comparative Examples). The test methods are described later.

TABLE 2

| | (parts by weight) | | | | | | |
|---|---|---|---|---|---|---|---|
| Cover composition | a | b | c | d | e | f | g |
| Elastollan XNY90A *2 | 100 | — | 80 | — | — | — | — |
| Elastollan XNY97A *3 | — | 100 | — | — | — | — | — |
| Elastollan ET880 *4 | — | — | — | 100 | — | — | — |

TABLE 2-continued

| Cover composition | (parts by weight) | | | | | | |
|---|---|---|---|---|---|---|---|
| | a | b | c | d | e | f | g |
| Pebax5533 *5 | — | — | 20 | — | — | — | — |
| Hi-milan1605 *6 | — | — | — | — | 50 | — | — |
| Hi-milan1706 *7 | — | — | — | — | 50 | 50 | — |
| Hi-milan AM7316 *8 | — | — | — | — | — | — | 50 |
| Surlyn 8120 *9 | — | — | — | — | — | 50 | 50 |
| Titanium dioxide | 4 | 4 | 4 | 4 | 4 | 4 | 4 |

*2: Elastollan XNY90A (trade name), polyurethane-based thermoplastic elastomer formed by using 4,4'-dicyclohexylmethane diisocyanate ($H_{12}MDI$) (=hydrogenated MDI), commercially available from BASF Polyurethane Elastomers Co., Ltd.; Shore A (JIS-A) hardness = 90
*3: Elastollan XNY97A (trade name), polyurethane-based thermoplastic elastomer formed by using 4,4'-dicyclohexylmethane diisocyanate ($H_{12}MDI$) (=hydrogenated MDI), commercially available from BASF Polyurethane Elastomers Co., Ltd.; Shore A (JIS-A) hardness = 97
*4: Elastollan ET880 (trade name), polyurethane-based thermoplastic elastomer formed by using 4,4'-diphenylmethane diisocyanate (MDI), commercially available from BASF Polyurethane Elastomers Co., Ltd.
*5: Pebax 5533 (trade name), polyamide-based thermoplastic elastomer, commercially available from Atofina Japan Co., Ltd.
*6: Hi-milan 1605 (trade name), ethylene-methacrylic acid copolymer ionomer resin obtained by neutralizing with sodium ion, manufactured by Du Pont-Mitsui Polychemicals Co., Ltd.
*7: Hi-milan 1706 (trade name), ethylene-methacrylic acid copolymer ionomer resin obtained by neutralizing with zinc ion, manufactured by Du Pont-Mitsui Polychemicals Co., Ltd.
*8: Hi-milan AM7316 (trade name), ethylene-methacrylic acid copolymer ionomer resin obtained by neutralizing with zinc ion, manufactured by Mitsui Du Pont Polychemical Co., Ltd.
*9: Surlyn 8120 (trade name), ethylene-methacrylic acid-acrylic acid ester terpolymer ionomer resin obtained by neutralizing with sodium ion, manufactured by Du Pont Co.

Examples 1 to 5 and Comparative Examples 1 to 5

The cover compositions were covered on the resulting core by injection molding to form a cover layer having a thickness of 1.4 mm and specific gravity shown in Table 3 (Examples) and Table 4 (Comparative Examples). Then, paint was applied on the surface to produce golf ball having a diameter of 42.7 mm. The value of [A/(t+1)] was determined by calculation from the resulting cover thickness (t) and cover hardness (A). The results are shown in the same Tables. With respect to the resulting golf balls, the properties of dimple (such as total number of dimples; the ratio (S) of the golf ball surface area occupied by the dimple; the ratio (V; $V_D/V_G$) of the sum of dimple volume under a plane enclosed by dimple edge ($V_D$) to the volume of the phantom sphere ($V_G$) assuming that the golf ball is a true sphere having no dimples on the surface thereof; and the total dimple volume (B)), weight, deformation amount, coefficient of restitution, moment of inertia, flight performance (spin amount and flight distance), shot feel, controllability and scuff resistance were measured or evaluated. The product AB was determined by calculating from the cover hardness (A) and total dimple volume (B). The results are shown in Tables 3 to 6. The test methods are as follows.

(Test Method)

(1) Deformation Amount

The deformation amount is determined by measuring a deformation amount, when applying from an initial load of 98 N to a final load of 1275 N on the core or golf ball.

(2) Core Hardness

Shore D hardness was measured at the center point and surface of the core. The surface hardness (D) of the core was determined by measuring a hardness at the surface of the resulting core. The center hardness (C) of the core was determined by cutting the resulting core into two equal parts and then measuring a hardness at its center point in section. The Shore D hardness was measured using a Shore D hardness meter according to ASTM D 2240.

(3) Cover Hardness

The cover hardness was determined by measuring a hardness, using a sample of a stack of the three or more heat and press molded sheets having a thickness of about 2 mm from the cover composition, which had been stored at 23° C. for 2 weeks, with a Shore D hardness meter according to ASTM D 2240.

(4) Properties of Dimple (4-1) Total Dimple Volume

Figure 1:
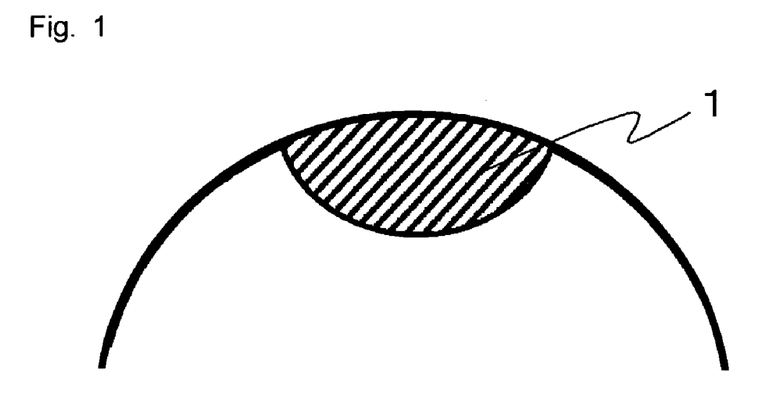
FIG. 1 is a schematic cross section of a dimple of the golf ball of the present invention for explaining the method of measuring the total volume of the dimples.

The total dimple volume is the sum of a volume of each dimple, and the volume of each dimple is the volume of the portion 1 as described in FIG. 1, which is enclosed by the bottom of the dimple and the surface of the phantom sphere assuming that the golf ball is a true sphere having no dimples on the surface thereof. That is, the volume of each dimple is a space corresponding to the portion removed from the golf ball by arranging the dimple on the surface of the golf ball. The dimple volume was determined by measuring a dimple shape in section using a pick-up type (contact type) of profile meter, and calculating from the dimple shape.

(4-2) Ratio of Volume Occupied by Dimple

Figure 2:
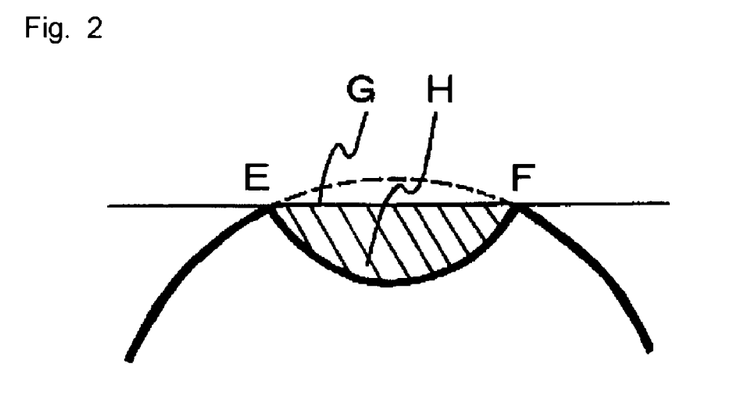
FIG. 2 is a schematic cross section of a dimple of the golf ball of the present invention for explaining the method of measuring the ratio of golf ball volume occupied by the dimples.

The ratio of golf ball volume occupied by the dimple is a ratio of (the sum of dimple volume under a plane enclosed by dimple edge) to (the volume of the phantom sphere) assuming that the golf ball is a true sphere having no dimples on the surface thereof. The volume of each dimple is determined by drawing a tangent line G through the points E and F in section as shown in FIG. 2, and calculating the volume of the portion H, which is enclosed by tangent line G and the bottom of the dimple. The dimple volume was determined by measuring a dimple shape in section using a pick-up type (contact type) of profile meter, and calculating from the dimple shape, as described in the total dimple volume.

(4-3) Ratio of Surface Area Occupied by Dimple

The ratio of the golf ball surface area occupied by the dimple was determined by obtaining a ratio of (the sum of an area of a spherical surface corresponding to the portion removed from the golf ball by arranging the dimple on the surface of the golf ball) to (the surface area of the golf ball) assuming that the golf ball is a true sphere having no dimples on the surface thereof.

(5) Coefficient of Restitution

An aluminum cylinder having a weight of 200 g was struck at a speed of 45 m/sec against a golf ball, and the velocity of the cylinder and the golf ball after the strike were measured. The coefficient of restitution of the golf ball was calculated from the velocity and the weight of both the cylinder and golf ball before and after strike. The measurement was conducted 5 times for each golf ball, and the average is shown as the coefficient of restitution of the golf ball.

(6) Moment of Inertia

The moment of inertia was determined by measuring natural frequency using a measuring apparatus for the moment of inertia, commercially available from Inertia Dynamics Co. and obtaining moment of inertia of the golf ball by calculation from the value of natural frequency.

(7) Flight Performance

After a No.1 wood club (W#1, a driver) having metal head was mounted to a swing robot manufactured by Golf Laboratory Co., the golf ball was hit at a head speed of 45 m/sec, the spin amount (backspin) and flight distance were measured. As the flight distance, total that is a distance to the stop point of the hit golf ball was measured. The measurement was conducted 5 times for each golf ball (n=5), and the average is shown as the result of the golf ball.

(8) Shot Feel

The resulting golf balls were evaluated by 10 golfers according to practical hitting test using a No.1 wood club (W#1, a driver) having metal head. The results shown in the Tables below are based on the fact that the most golfers evaluated with the same criterion about shot feel. The evaluation criteria are as follows.

Evaluation Criteria

○: The golfers felt that the golf ball has good shot feel such that the impact force at the time of hitting is small and rebound characteristics are good.

Δ: The golfers felt that the golf ball has fairly good shot feel.

x: The golfers felt that the golf ball has poor shot feel such that impact force at the time of hitting is large, or the golf ball has heavy and poor shot feel.

(9) Controllability

The resulting golf balls were evaluated by 10 golfers according to practical hitting test using a pitching wedge (PW). The results shown in the Tables below are based on the fact that the most golfers evaluated with the same criterion about shot feel. The evaluation criteria are as follows.

Evaluation Criteria

○: The golfers felt that it is easy to apply spin on the golf ball, and the golf ball has good controllability.

Δ: The golfers felt that the golf ball has fairly good controllability.

x: The golfers felt that it is difficult to apply spin on the golf ball such that the golf ball slips on the face of golf club, and the golf ball has poor controllability.

(10) Scuff Resistance

After a pitching wedge (PW) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria

○: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

TABLE 3

|  | Example No. | | | | |
| --- | --- | --- | --- | --- | --- |
|  | 1 | 2 | 3 | 4 | 5 |
| (Core) | | | | | |
| Composition | i | ii | iii | ii | ii |
| Weight (g) | 37.3 | 37.3 | 37.3 | 37.3 | 37.3 |
| Specific gravity | 1.124 | 1.122 | 1.121 | 1.122 | 1.122 |
| Deformation amount (mm) | 2.70 | 3.15 | 3.55 | 3.15 | 3.15 |
| Shore D hardness | | | | | |
| Center hardness (C) | 34 | 33 | 32 | 33 | 33 |
| Surface hardness (D) | 60 | 57 | 53 | 57 | 57 |
| Hardness difference (D − C) | 26 | 24 | 21 | 24 | 24 |
| (Cover) | | | | | |
| Composition | a | a | b | b | c |
| Specific gravity | 1.101 | 1.101 | 1.101 | 1.101 | 1.088 |
| Shore D hardness (A) | 41 | 41 | 47 | 47 | 43 |
| Hardness difference (D − A) | 19 | 16 | 6 | 10 | 14 |
| A/(t + 1) | 17.1 | 17.1 | 19.6 | 19.6 | 17.9 |
| Dimple | | | | | |
| Total number | 410 | 410 | 410 | 410 | 410 |
| Ratio S (%) | 84 | 84 | 84 | 84 | 84 |
| Ratio V (%) | 0.80 | 0.80 | 0.75 | 0.75 | 0.80 |
| Total volume (B) (mm$^3$) | 540 | 540 | 520 | 520 | 540 |
| Product AB | 22140 | 22140 | 24440 | 24440 | 23220 |

TABLE 4

| | Comparative Example No. | | | | |
|---|---|---|---|---|---|
| | 1 | 2 | 3 | 4 | 5 |
| (Core) | | | | | |
| Composition | ii | iv | iv | iv | v |
| Weight (g) | 39.3 | 39.3 | 39.3 | 39.3 | 39.3 |
| Specific gravity | 1.122 | 1.159 | 1.159 | 1.159 | 1.122 |
| Deformation amount (mm) | 3.15 | 3.10 | 3.10 | 3.10 | 3.05 |
| Center hardness (C) | 33 | 34 | 34 | 34 | 45 |
| Surface hardness (D) | 57 | 57 | 57 | 57 | 50 |
| Hardness difference (D − C) | 24 | 23 | 23 | 23 | 5 |
| (Cover) | | | | | |
| Composition | d | e | f | g | b |
| Specific gravity | 1.141 | 0.989 | 0.984 | 0.985 | 1.101 |
| Shore D hardness (A) | 30 | 64 | 55 | 42 | 47 |
| Hardness difference (D − A) | 27 | −7 | 2 | 15 | 3 |
| A/(t + 1) | 12.5 | 26.7 | 22.9 | 17.5 | 19.6 |
| Dimple | | | | | |
| Total number | 410 | 410 | 410 | 410 | 410 |
| Ratio S (%) | 84 | 84 | 84 | 84 | 84 |
| Ratio V (%) | 0.80 | 0.75 | 0.75 | 0.80 | 0.75 |
| Total volume (B) (mm³) | 540 | 520 | 520 | 540 | 540 |
| Product AB | 16200 | 33280 | 28600 | 22680 | 25380 |

TABLE 5

| | Example No. | | | | |
|---|---|---|---|---|---|
| | 1 | 2 | 3 | 4 | 5 |
| (Golf ball) | | | | | |
| Weight (g) | 45.4 | 45.4 | 45.4 | 45.4 | 45.3 |
| Deformation amount (mm) | 2.60 | 2.95 | 3.25 | 2.85 | 2.95 |
| Coefficient of restitution | 0.772 | 0.767 | 0.763 | 0.770 | 0.768 |
| Moment of inertia (gcm²) | 82.4 | 82.2 | 82.3 | 82.2 | 82.0 |
| Flight performance | | | | | |
| Spin amount (rpm) | 3100 | 3050 | 2950 | 2950 | 3000 |
| Total (m) | 222 | 220 | 219 | 223 | 220 |
| Shot feel | ○ | ○ | ○ | ○ | ○ |
| Controllability | ○ | ○ | ○ | ○ | ○ |
| Scuff resistance | ○ | ○ | ○ | ○ | ○ |

TABLE 6

| | Comparative Example No. | | | | |
|---|---|---|---|---|---|
| | 1 | 2 | 3 | 4 | 5 |
| (Golf ball) | | | | | |
| Weight (g) | 45.7 | 45.3 | 45.3 | 45.3 | 45.4 |
| Deformation amount (mm) | 3.05 | 2.55 | 2.75 | 2.85 | 2.90 |
| Coefficient of restitution | 0.760 | 0.777 | 0.762 | 0.752 | 0.772 |
| Moment of inertia (gcm²) | 83.5 | 79.2 | 79.0 | 78.9 | 82.1 |
| Flight performance | | | | | |
| Spin amount (rpm) | 3600 | 2800 | 2950 | 3300 | 3450 |
| Total (m) | 206 | 223 | 217 | 212 | 210 |
| Shot feel | ○ | x | Δ | ○ | Δ |
| Controllability | ○ | x | Δ | ○ | ○ |
| Scuff resistance | Δ | ○ | x | x | ○ |

As is apparent from Tables 5 and 6, the golf balls of Examples 1 to 5 of the present invention, when compared with the golf balls of Comparative Examples 1 to 5, had good shot feel, long flight distance when hit by a driver, and excellent controllability and excellent scuff resistance when hit by a pitching wedge (PW).

On the other hand, in the golf ball of Comparative Example 1, since the cover hardness is low, the spin amount at the time of hitting is increased, which reduces the flight distance. In addition, since the product AB is small, the hit golf ball creates blow-up trajectory, which reduces the flight distance.

In the golf ball of Comparative Example 2, since only the mixture of hard ionomer resins is used for the cover material, the cover hardness is too high, and the difference (D−A) between the surface hardness (D) of the core and the cover hardness (A) is small. Therefore, the shot feel is poor and the controllability when hit by a pitching wedge is poor.

In the golf ball of Comparative Example 3, since only the mixture of hard ionomer resin and soft ionomer resin is used for the cover material, the cover hardness is high, but the coefficient of restitution is small, which reduces the flight distance. In addition, the scuff resistance is poor.

In the golf ball of Comparative Example 4, since only the mixture of soft ionomer resins is used for the cover material, the cover is too soft, and the spin amount when hit by a driver is increased, which reduces the flight distance too much.

In the golf ball of Comparative Example 5, since the hardness difference (DC) between the surface hardness (C) and center hardness (D) of the core is small, the spin amount at the time of hitting is high, which reduces the flight distance too much.

What is claimed is:

1. A two-piece solid golf ball comprising a core and a cover covering the core, wherein the core comprises cis-1,4-polybutadiene as a main component, a surface hardness, in Shore D hardness, of the core being higher than a center hardness, in Shore D hardness, of the core by not less than 15, the cover is formed from a cover composition mainly comprising polyurethane-based thermoplastic elastomer as a base resin, having a hardness, in Shore D hardness, of 35 to 55, and the hardness of the cover is lower than the surface hardness of the core, and when the hardness of the cover is represented by A and a total dimple volume is represented by B ($mm^3$) and within the range of 350 to 540 $mm^3$, the product AB is within the range of 20,000 to 30,000, and a total number of dimples is within the range of 350–450.

2. The two-piece solid golf ball according to claim 1, wherein the cover has a thickness of 0.5 to 2.0 mm, and a specific gravity of the cover is not more than that of the core.

3. The two-piece solid golf ball according to claim 1, wherein the polyurethane-based thermoplastic elastomer is formed by using a cycloaliphatic diisocyanate.

4. The two-piece solid golf ball according to claim 1, wherein the cycloaliphatic diisocyanate is 4,4'-dicyclohexylmethane diisocyanate ($H_{12}MDI$).

* * * * *